United States Patent [19]
Perhats

[11] 3,732,447
[45] May 8, 1973

[54] CLUTCH AND BRAKE MOTOR ARRANGEMENT

[76] Inventor: Frank J. Perhats, 1280 Burr Oak Lane, Barrington, Ill. 60610

[22] Filed: Dec. 13, 1971

[21] Appl. No.: 207,002

[52] U.S. Cl. ........................................310/76, 310/77
[51] Int. Cl. ..........................................H02k 7/10
[58] Field of Search .........................310/37, 77, 76; 188/156, 158–164

[56] References Cited
UNITED STATES PATENTS

| | | | |
|---|---|---|---|
| 2,548,731 | 4/1951 | Lehde | 310/37 UX |
| 3,407,319 | 10/1968 | Arraiza | 310/76 X |
| 3,535,568 | 10/1970 | Haverkamp | 310/77 |
| 3,447,005 | 5/1969 | Yokoyama | 310/76 X |

*Primary Examiner*—D. F. Duggan
*Attorney*—Irwin C. Alter et al.

[57] ABSTRACT

A motor brake arrangement comprising an electric motor having a brake disc attached to its shaft directly, or through a one-way clutch. The brake disc is pulled against brake pads to either stop the motor rotor quickly or to keep it from turning in one direction when the motor is not operated. Permanent magnetic means are used to assure sufficient frictional contact on the brake pads to stop or hold the motor shaft.

15 Claims, 3 Drawing Figures

PATENTED MAY 8 1973 3,732,447

INVENTOR
FRANK J. PERHATS

BY
Alter, Weiss and Whitesel
ATTORNEYS

CLUTCH AND BRAKE MOTOR ARRANGEMENT

This invention relates to clutch and brake motor arrangements and more particularly to such arrangements used to prevent rotation of the output shaft of the motor under load conditions when the motor is not energized, or to stop the motor rotor quickly in indexing applications where motor rotor coast is not permissable.

Clutch and brake motors are power drive units with an output shaft used to drive and control the rotation of a load. The load to be driven often remains on the load shaft after the de-energization of the motor. For example, when the clutch and brake motor arrangement are used for driving a loaded winch, it is necessary for the clutch and brake arrangement to be operative even after the de-energization of the motor to prevent the loaded winch from unreeling and dropping the load.

Another example of the use of the clutch and brake motor arrangement is in the operation of hospital beds. It is necessary to automatically lift the bed with the patient therein against the force of gravity and to retain the bed in the lifted position after the motor is de-energized while the load is still on the output shaft.

Clutch and brake motors are most advantageous when load engagement, disengagement or braking are frequent, such as in the exemplary winch or hospital bed applications. In such applications, in the past, relatively cumbersome and complicated systems have been used to assure that the output shaft is braked to preclude the unreeling or dropping of the load after de-energization of the motor. Prior art clutch and brake motor arrangements include motor-mounted shoe brakes comprising a drum fastened to a rear motor shaft extension having internal shoes. The brake is spring-actuated and electrically released by a solenoid. A solenoid is wired directly to the motor. When power is applied to the motor, the brake solenoid is simultaneously energized and the shoe is disengaged from the drum. When power is removed from the motor, the solenoid is de-energized and the springs force the shoe against the drum.

Among the difficulties encountered in using such a brake-clutch arrangement is the fact that power is necessary to operate the solenoid, which power of course is taken from the motor. In addition, the spring forces and the spring positioning is such that as the braking surface wears, less force is applied, rather than more force, in maintaining the juxtaposition of the braking surfaces.

Accordingly, an object of this invention is to provide new and unique clutch and brake motor arrangements.

A related object of this invention is to provide clutch and springless brake arrangements utilizing non-electrical means for assuring a fail-safe operation of the brake and clutch arrangement under loaded conditions, particularly useful to insure the safe operation of motorized hoists. A further object of this invention is to provide a brake and clutch arrangement utilizing a one way clutch and a driven brake wherein the driven brake is forced towards a braking surface by permanent magnet means.

Yet another object of this invention is to provide clutch and brake motor arrangements wherein under de-energized conditions the braking surfaces are contiguous as in the energized position. The braking surfaces are spaced apart from each other so that the motor can operate without having to overcome frictional forces created by the braking surfaces.

A further object of this invention is to provide a means of utilizing the solenoid action of motor rotors to provide rapid stopping of motor rotors in bi-directional or undirectional motors wherein motor coast after de-energization is undesirable.

A preferred embodiment of the inventive brake arrangement comprises an electrical induction motor having a brake disc attached to its shaft through a one-way clutch. Three friction pads are equally spaced circumferentially around the motor shaft and attached to the outer casing of the induction motor.

An annular permanent magnet is attached to the outer casing of the motor around the brake pads facing toward the brake disc so as to assure that there is adequate pressure between the brake disc and the three fixed brake pads irrespective of wear on the brake pads.

The clutch brake motor arrangement is idle when rotated in one direction to lift a weight. This is the direction in which the one-way clutch is not engaged. There is no braking frictional force system to overcome in that direction. In the direction of lowering the weight, the motor force needs only overcome the braking frictional force since gravitational forces aid in causing the shaft to rotate against the clutch and brake arrangement.

Another embodiment of the invention has the braking surfaces so arranged that when the motor is energized, then the shaft of the motor is drawn towards the center of the stator of the motor, and the brake is thus automatically disengaged. Upon de-energization of the motor, the magnetic force supplied by the permanent magnet attached to the motor case forces the clutch brake wheel towards the brake pads on the motor casing to prevent the rotation of the shaft in the direction of the load.

The above mentioned other objects and features of the invention will be explained in detail with the aid of the accompanying drawings in which.

Figure 1:
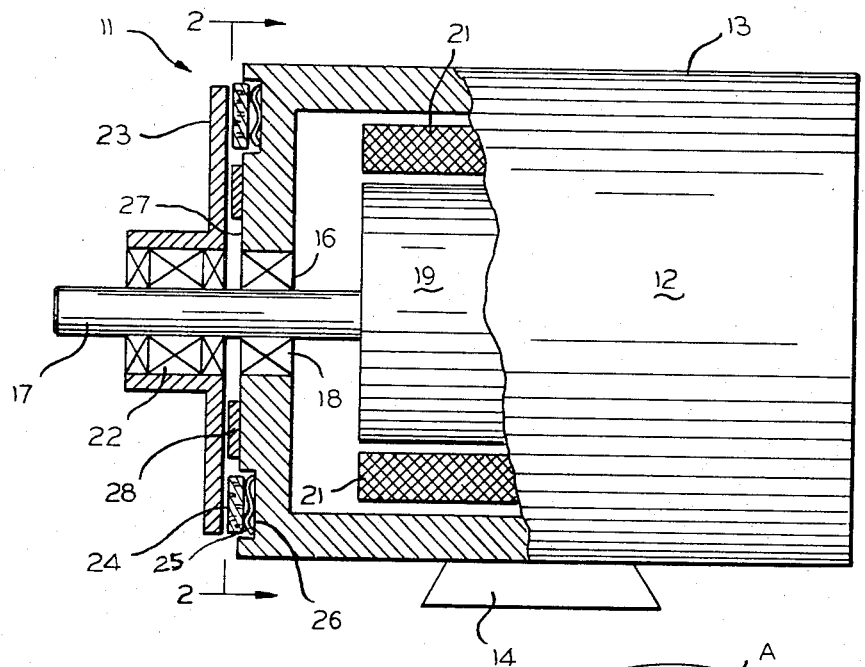
FIG. 1 is a partial sectional view of a clutch and brake motor arrangement in accordance with the invention.

Turning now to the drawings, in FIG. 1 there is shown at 11, the inventive clutch and brake motor arrangement comprising a motor 12 having an outer case 13 and resting on base 14. The base is shown merely by way of illustration; since, the motor could be mounted to a winch arrangement or a hospital bed arrangement, for example, using flanged plates, but nonetheless, some means must be provided for anchoring the motor. The motor casing 13 has an aperture 16 therein to enable an output shaft 17 to protrude therethrough. It is usual to provide shaft bearings such as are schematically shown at 18.

The shaft is connected to the motor rotor which is schematically shown at 19. It should be understood that it is often found convenient to provide the rotor with fanlike blades at the ends thereof to facilitate passage of air through the motor casing and thereby dissipate the heat generated by the motor. These things are not shown since it is believed that it is within the skill of those familiar with the art to provide the proper motor accessories. What is shown are the essential elements of the inventive clutch and motor brake arrangement. Thus, for example, while a squirrel cage type motor is shown, different types of motor could be utilized and still be within the invention. The stator windings are schematically shown at 21 both above and below the rotor 19.

Means are provided for maintaining the shaft stationary; that is, preventing the shaft from rotating after the motor is de-energized even through the output shaft is loaded. In greater detail, a one-way clutch 22 slip fits over the output shaft 17 of the motor. The one-way clutch may be any of the many variety of one-way clutches that are commercially available. For example, a Torrington one-way clutch manufactured by the Torrington Company could be used. The one-way clutch, as indicated by its name, allows free rotation of the shaft in one direction, but grasps and holds onto the shaft when the shaft rotates in another direction.

For example, when the shaft rotates in a clockwise direction, the shaft and clutch are uncoupled. When the shaft rotates in a counter-clockwise direction, then the shaft and clutch are coupled together. Thus, in the counter-clockwise direction, the clutch 22 and clutch plate or brake wheel 23 rotate.

Means are provided on the brake disc 23 for increasing the friction of the brake disc against the motor casing. More particularly, means such as cork friction pads 24 are mounted on the motor casing. A plurality of such pads are fastened to the plate at various intervals around the circumference or an annular ring made of cork friction material is attached to the plate.

Figure 2:
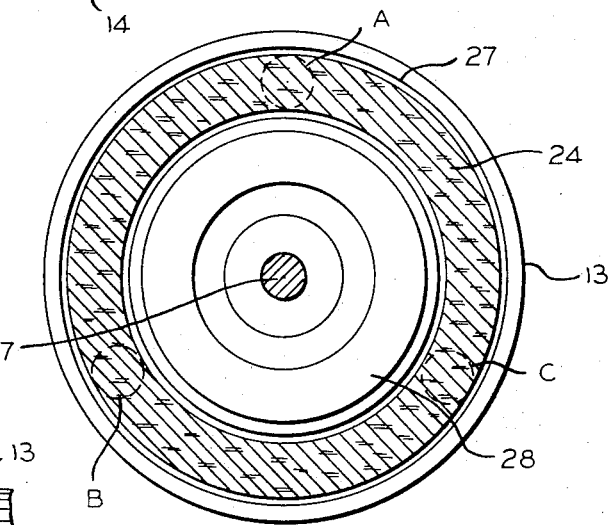
FIG. 2 is a view of the motor looking in the direction of arrows 2—2 of FIG. 1 with the clutch brake removed.

In a preferred embodiment, pockets are provided for mounting the pads shown as A, B and C in FIG. 2. The pads as shown in FIG. 1, loosely fit into pockets such as pocket 26. The pads float on resiliant means such as Bellville Spring 25 to assure proper alignment and pressure of the pads. Alternatively, the annular ring is mounted as shown in FIG. 2 as 24.

Means are provided to assure that there is a proper pressure between brake pad 24 and brake disc 23. More particularly, permanent magnet means 28 are attached to the end plate 27 of motor casing 13. The brake disc or clutch plate 23 is fabricated from cast iron and this is strongly attracted to the magnetic means 28. The magnetic means in a preferred embodiment is an annular ring made of sintered magnetic material. Rather than an annular ring, individual magnetic elements could, of course, be strategically mounted at various intervals around the motor casing so as to attract the brake wheel 23 and thereby assure proper pressure of the brake wheel friction disc against the endplate 27 of the motor casing 26. The pressure has to be sufficient to stop the shaft 17 that is coupled to the one-way clutch 22 by the friction between the brake disc 23 and the motor casing even though the load on the unenergized motor tends to cause the shaft to rotate in a counterclockwise direction, in this example.

It should be understood that the location of the magnetic means is not important to the invention. What is important is that the magnetic means are located so as to cause the proper pressure to be applied between the brake disc and the fixed brake pads to stop the shaft from rotating.

When the shaft 17 which is normally connected through a gear box (not shown) to the load is rotated in a clockwise direction the load is lifted up against the forces of gravity. When the shaft 17 turns in a counter clockwise direction, the load is lowered. If the motor is de-energized, the load tends to turn the shaft in a counter clockwise direction. The shaft is then automatically coupled to clutch 22 and the frictional forces stop the shaft from rotating. When the motor is energized and controlled to turn in a counter clockwise direction; that is, to lower the load, then the motor has to overcome the forces of friction which otherwise prevent the gravitational forces from lowering the load. When the motor is turned in the clockwise direction, then the load is lifted and there is no coupling between the shaft and the clutch. Thus, in the clockwise direction, there is no necessity of overcoming the frictional force.

It should be noted that as the friction material, i.e. cork discs 24 wear down, the magnetic force between the brake disc 23 and the sintered permanent magnet 28 is increased since the distance between the magnet 28 is increased since the distance between the magnet and the brake disc is decreased. The increase in contracting force is the opposite of what occurs when a spring is utilized to maintain contact between the brake pad 24 and the brake disc 23.

The wear of the cork discs is normally relatively slow, and the springs assure maximum useage. Nonetheless, the problem encountered by the wear is minimal since it is easy to remove the clutch assembly and replace the cork discs.

Figure 3:
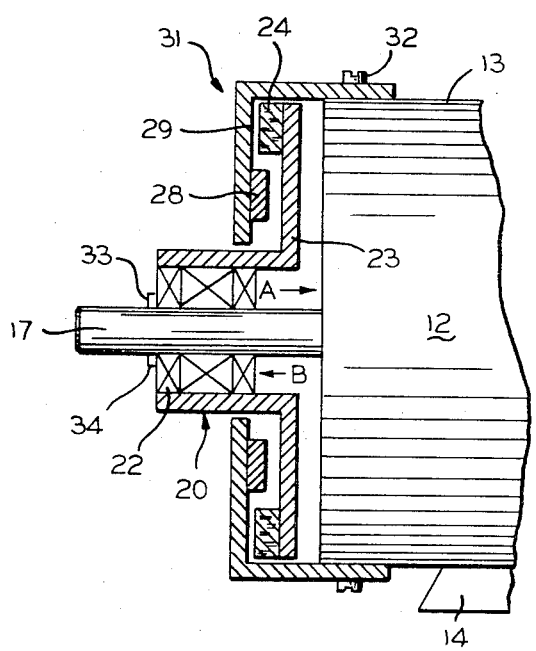
FIG. 3 is a partial sectional view of another embodiment of the inventive clutch and brake motor arrangement.

The embodiment of FIG. 3 is a showing of an embodiment of the invention wherein the wear of the frictional material is minimized since the only time the frictional material and motor brake disc are in contact is when the motor is de-energized and the shaft is prevented from rotating in the load lowering direction.

In greater detail, the embodiment of FIG. 3 also shows a motor base 14 supporting a motor 12 having an outer case 13 and a shaft 17. Slipped over the shaft is a one-way clutch assembly 20. The clutch assembly comprises the one-way clutch 22 having the brake disc or clutch plate 23 integrally attached thereto. Again there is shown the frictional material such as the brake pad 24 attached to the brake wheel 23. Instead of the grooves in the motor, however, the friction pads 24 are shown mounted on the plate 23 juxtaposed to a braking surface 29 attached to the motor casing. The braking surface is in the interior of a hollow cylindrical endpiece 31 attached to the motor casing using any well known fastener such as screw 32. The magnet 28 is also attached to surface 29 of endpiece 31. Thus, the brake plate 23 with the frictional material 24 attached thereto is normally contiguous to surface 29 to prevent the rotation of the brake plate. The pressure between the brake surface 29 and the frictional material 24 is caused by magnetic forces from sintered permanent magnet 28 acting on the cast iron brake wheel 23.

When the motor is energized, then the shaft 17 attached to the rotor of the motor (not shown in FIG. 3) is pulled toward the middle of the stator by the normal solenoidal forces of the motor. This inward pulling force is applied to the clutch assembly 20 through means such as pins 33 and 34, for example, to remove the contiguous relationship of frictional material 24 and braking surface 29 and thereby add to the life of the frictional material 24.

Thus, whenever the motor is energized, whether rotating in a clockwise or counter-clockwise direction, there is no frictional force between frictional material 24 and the braking surface 29. Hence, in the clockwise direction, there is no coupling between clutch assembly 20 and shaft 17 and in the counter clockwise direction where there is clutching coupling between shaft 17 and clutch assembly 20, the whole shaft and clutch assembly are forced in the direction of Arrow A to remove the contiguous relationship between material 24 and surface 29. However, when the motor is not energized and the load tends to turn the shaft in the counter-clockwise direction, the friction between material 24 and surface 29 prevents such rotation and thereby holds the load in a position into which it was last brought by the energized motor. It should be understood that the embodiment of FIGS. 1 and 2 could similarly have the rotor pulled to the left when energized to remove any contact between disc 24 and plate 23 while the motor is energized.

Further, in the embodiment shown in FIG. 3, the clutch 22 may be eliminated and the brake wheel 23 directly fixed to shaft 17. All other functions would remain the same as described above. This embodiment would be utilized for the rapid stopping of the rotor after de-energization of the motor in applications where the sole function of the brake would be to stop rotor coast. This embodiment could also be used in lightly loaded applications where holding against a load after motor de-energization requires a brake.

In operation, then, shaft 17 is connected through a gear box to the load. When the motor is energized, shaft 17 is moved in the direction of the arrow A by the normal solenoidal forces of the motor. Responsive to the movement of the shaft 17 in the direction of the arrow A, clutch assembly 20 is also moved in that direction by pins 33 and 34. Thus, there is no contact between frictional material 24 and surface 29 when the motor is energized and the load can be raised or lowered, that is, moved in the clockwise or counterclockwise direction effectively, without having to overcome the braking forces. When the motor is de-energized, the shaft 17 moves back into its normal position in the direction of the arrow B under the attractive force of permanent magnet 28 on brake disc 23. The pressure between the frictional material 24 and the braking surface 29 is enhanced by the magnetic forces of permanent magnet 28 acting on cast iron brake plate 23 and the shaft 17 is prevented from rotating in the counter-clockwise direction, thus the load is maintained in the position at which it was brought by the energized motor.

While the principles of the invention have been described above in connection with specific apparatus and applications, it is to be understood that this description is made only by way of example and not as a limitation of the scope of the invention.

I claim:
1. A magnetic motor brake arrangement comprising: electric motor means,
shaft means for connecting the rotor of said motor to a load,
one way clutch means surrounding said shaft means and being coupled to said shaft means when said shaft means operates in a given direction and being de-coupled from said shaft means when said shaft means operates in the opposite direction,
brake means affixed to said clutch means,
further brake means associated with the motor casing, and
permanent magnet means for forcing said brake means into contiguous relationship with said further brake means to prevent the rotation of said shaft in said given direction, even when said motor is de-energized.

2. The magnetic motor brake arrangement of claim 1 wherein said brake means comprises a brake wheel attached to said clutch means.

3. A magnetic motor brake arrangement comprising: electric motor means,
shaft means for connecting the rotor of said motor to a load,
one way clutch means surrounding said shaft means and being coupled to said shaft means when, said shaft means operates in a given direction and being de-coupled from said shaft means when said shaft means operates in the opposite direction,
brake means associated with said clutch means,
said brake means comprising a brake wheel integral to said clutch means,
said brake means further comprising stationary brake surface means to stop said brake disc when said brake disc and said stationary braking surface means are contiguous to one another, and
permanent magnet means for forcing said brake disc and said stationary braking surface into contiguous relation-ship with one another.

4. The magnetic motor brake arrangement of claim 3 wherein the stationary braking surface is on said motor casing, and
wherein said permanent magnet means attracts said brake wheel toward said motor casing to cause said braking surface means and said brake wheel to be contiguous to one another.

5. The magnetic motor brake arrangement of claim 4 wherein said braking surface comprise pockets in said motor casing, pads mounted in said pockets, and
wherein means are provided in said pockets for assuring that the tops of said pads are juxtaposed to said brake wheel when said permanent magnet means causes said brake wheel and said braking surface means to be contiguous to one another.

6. The magnetic motor brake arrangement of claim 5 wherein said brake wheel and braking surface means are always in contiguous relationship to one another due to said permanent magnet means.

7. The magnetic motor brake arrangement of claim 4 wherein non-resilient means are provided for moving said clutch and integral brake wheel away from the braking surface means when said motor is energized so that said brake wheel and said braking surface are then noncontiguous.

8. The magnetic motor brake arrangement of claim 7 wherein said non-resilient means comprises:

end-bell means attached to said motor casing and extending frontwards therefrom over said brake wheel, said braking surface means being mounted on the wall of said end-bell means to register with friction means on said brake wheel means, said friction means and said braking surface means being contiguous when said motor is de-energized, and pin means on the shaft of said motor to cause said clutch means to move with the shaft of said motor when said motor is energized to disconnect said contiguous relationship between said friction means and said braking surface means.

9. The magnetic motor braking arrangement of claim 1 wherein said permanent magnet means comprises a sintered permanent magnet.

10. The magnetic motor braking arrangement of claim 3 wherein said brake wheel cooperates with cork friction pads mounted on the end-bell of the motor.

11. A magnetic motor brake arrangement comprising:
electric motor means,
shaft means for connecting the rotor of said motor to a load,
brake means fixed to said shaft means,
further brake means affixed to the motor casing, and
permanent magnet means for forcing said brake means to abut said further brake means to prevent the rotation of said shaft responsive to the de-energization of said motor.

12. A magnetic motor brake arrangement comprising:
electric motor means,
shaft means for connecting the rotor of said motor to a load,
brake means fixed to said shaft means,
said brake means comprising a brake wheel fixed to said shaft means,
stationary braking surface means to stop said brake wheel when said brake wheel and said stationary braking surface means are contiguous to one another,
permanent magnet means for enabling said brake means to prevent the rotation of said shaft responsive to the de-energization of said motor, and
said permanent magnet means being positioned to force said brake wheel and brake surface means into contiguous relationship when said motor is de-energized.

13. The magnetic motor brake arrangement of claim 12 wherein said braking surface means comprise pockets in said motor casing,
pads mounted in said pockets, and
wherein means are provided in said pockets for assuring that the tops of said pads are juxtaposed to said brake wheel when said permanent magnet means causes said brake wheel and braking surface means to be contiguous to one another.

14. The magnetic motor brake arrangement of claim 13 wherein the rotor shaft and brake wheel are moved away from said brake surface means when said motor is energized.

15. The magnetic motor brake arrangement of claim 14 wherein said means in said pockets for assuring that the tops of said pads are juxtaposed to said brake wheel comprises spring means,
said pads fitting in said pockets to float on said springs.

* * * * *